INVENTORS,
G. W. PARR,
R. CROUCHER,
BY
ATTORNEY

Patented Feb. 10, 1925.

1,526,179

UNITED STATES PATENT OFFICE.

GEOFFREY WARNER PARR, OF LONDON, AND ROBERT CROUCHER, OF BROMLEY, ENGLAND.

METHOD OF AERATING OR AGITATING LIQUIDS.

Application filed January 26, 1924. Serial No. 688,870.

*To all whom it may concern:*

Be it known that we, GEOFFREY WARNER PARR and ROBERT CROUCHER, both British subjects, and residents of Loampit Hill House, Lewisham, London, S. E. 13, England, and 2 Bloomfield Road, Bromley, Kent, England, respectively, have invented certain new and useful Improvements in a Method of Aerating or Agitating Liquids, of which the following is a specification, such as will enable others skilled in the art to which it appertains to make and use the same.

This invention relates to an apparatus for aerating and agitating water or other liquid and whilst applicable for several purposes is especially designed for use with aquaria, live fish and eel tanks and the like and will be more particularly described with reference to such tanks.

At present, fish, eels and the like are kept alive in aquaria and storage tanks either by allowing fresh water to flow continuously through the tank or by bubbling air or oxygen through the water in the tank; in either case the object being to maintain a sufficiently high percentage of free oxygen dissolved in the water to support the animal life in the tank.

Where the free oxygen content of the water is maintained by bubbling oxygen or air through it, it is usually found necessary to allow a small amount of water to flow through the tank in order, first, to carry off scum, slime and other unwanted foreign matter that may find its way into the water, and second, to remove the carbon dioxide exhaled by the life in the water. The water fed to the tank for this purpose is usually taken from the public mains and is therefore at a comparatively high pressure, and the object of the present invention is to recover the pressure energy in the water and to use it for the purpose of forcing air through the water, resulting in a great saving of water in the water flow system or in the elimination of oxygen tanks or air pumps in the bubbling gas systems.

The apparatus comprises an injector wherein a jet of water draws air from the atmosphere and forces it under slight pressure into the water in the tank. After giving up part of its pressure energy to the air in the injector the water flows into the tank together with the air it has drawn from the atmosphere.

The invention can be carried out in various forms of which an example is shown in the accompanying drawings.

The apparatus consists of a body $a$ having a cone $b$ screwed in one end and an expansion venturi $c$ screwed in the other end. Between the cone $b$ and the venturi $c$ is a mixing cone $d$ held against a shoulder in the body by the cone $b$. On the upper side of the body is a boss carrying the air pipe $e$, and the cone $b$ is coupled to the water pipe $f$ by the union $i$. Drilled through the mixing cone $d$ are a number of holes $g$ whose object is to admit air to the space $l$ between the cone $b$ and the mixing cone.

The injector is held in position in the tank $h$ by a shoulder on the venturi, as shown, and the air pipe is taken to a point above the highest water level.

The plug $j$ in the back of the cone $b$ carries a filter gauze $k$ and can be removed for cleaning purposes, giving access to both the filter gauze and the cone $b$. Access can be obtained to the mixing cone $d$ by uncoupling the union $i$ and removing the cone $b$.

The action of the apparatus is as follows:—

Water enters through the pipe $f$ and filter $k$ and passes through the cone $b$ where it gains velocity and loses pressure, the cone being so proportioned that the exit pressure of the resulting water jet $n$ falls to a point slightly below atmospheric air being therefore drawn into the space $l$ between the cone $b$ and the mixing cone, through the air pipe $e$ and the holes $g$. This air is carried by the jet into the mixing cone $d$ where it mixes with the water and causes it to issue from the mixing cone in the form of a high velocity spray $o$.

The space $m$ between the mixing cone $d$ and the venturi $c$ is filled with air, drawn down the pipe $e$ by the jet $h$, and this air is carried by the large surface exposed by the spray $o$ into the expansion venturi $c$ where the mixture of air and water loses velocity and gains sufficient pressure to overcome the static head of water at the space $m$. The air then bubbles to the surface of the water, a certain amount being dissolved by the water to replace that taken out by the fish or the like in the tank, and the water escapes by the waste pipe, carrying with it any impurities that may collect in the tank, including the carbon dioxide exhaled by the fish or other animal life in the tank.

Figure 1:
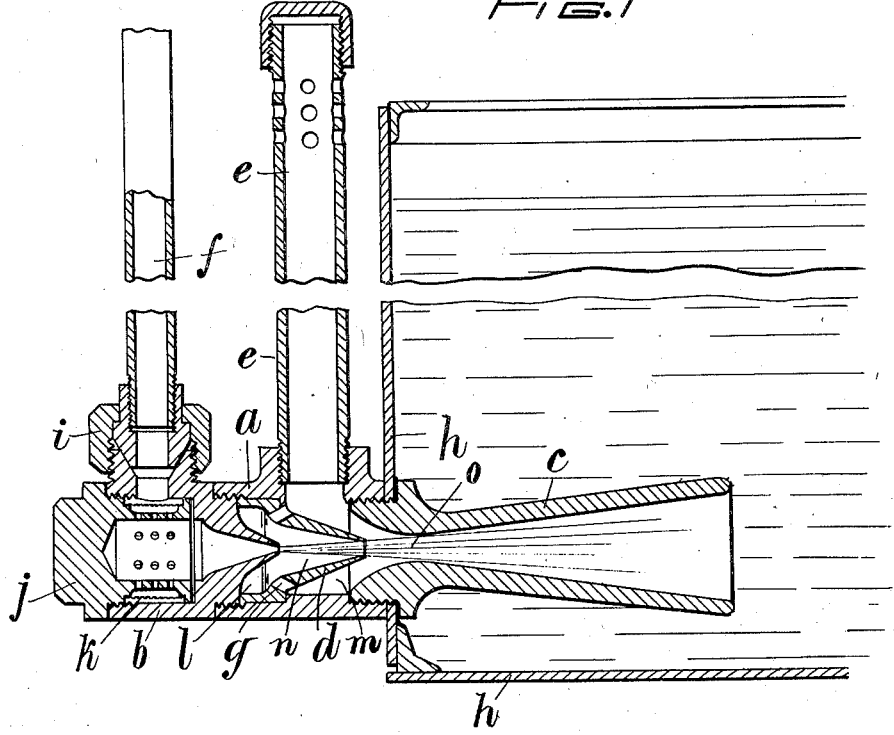
Fig. 1 is a cross section through the apparatus as seen applied to a tank.
Figure 2:
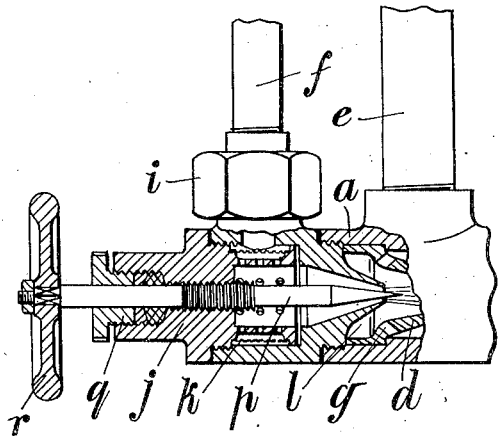
Fig. 2 shows an adjustable water jet applicable to the injector shown in Fig. 1.

When there is a large variation in the quantity of fish or the like in the tank, as, for example, in the tanks used by dealers in live fish or eels and it is important to obtain the greatest possible economy of water, the size of the aperture in the cone $b$ may be adjustable, as shown in Fig. 2, which shows a part section of an injector similar to that shown in Fig. 1 but fitted with an adjustable water cone, consisting of a cone $b$ and filter $k$ as before, (the adjustment of the aperture being carried out by a screwed taper needle $p$ passing through a gland $q$ and operated by a hand wheel $r$).

Figure 3:
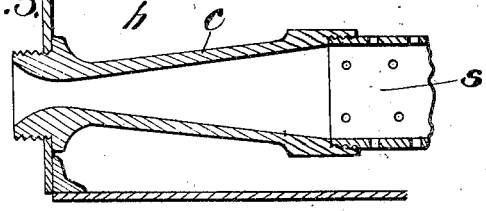
Figure 3 is a broken elevation, partly in section showing the use of a perforated pipe within the tank.

Instead of being delivered direct into the water in the tank the mixture of air and water from the injector may be delivered into a system of perforated pipes, part of which is shown at $s$ in Fig. 3, and distributed over the bottom of the tank.

It will be evident that modifications of the apparatus or fitting shown can be made within the spirit of the invention and the scope of the following claims: for example, the injector may be positioned above the surface of the fluid in the tank, and deliver its air through a pipe to a point below the surface; or instead of there being only one mixing cone $d$ there may be several, proportioned so that the velocity energy in the water jet is given up to the air being pumped in several stages; this is desirable in cases where the water pressure is very high, say 100 pounds per square inch, or over.

What we claim is:—

1. The combination with a tank, of a Venturi tube arranged therein and projecting through an opening in the tank, said tube being formed with a shoulder to bear against the inner surface of the tank, a body member arranged on the projecting end of the Venturi tube, a mixing cone arranged in the body member and having an opening formed in the wall thereof, an air pipe open to the atmosphere and delivering air to the body in advance of the mixing cone and to the interior of the cone through the opening therein, and a jet secured to the body for delivering liquid longitudinally of the mixing cone.

2. The combination with a tank, of a Venturi tube arranged therein and projecting through an opening in the tank, said tube being formed with a shoulder to bear against the inner surface of the tank, a body member arranged on the projecting end of the Venturi tube, a mixing cone arranged in the body member and having an opening formed in the wall thereof, an air pipe open to the atmosphere and delivering air to the body in advance of the mixing cone and to the interior of the cone through the opening therein, a plug removably secured to the body beyond the cone and communicating with a source of liquid supply, a portion of the plug being formed as a jet to direct the liquid lengthwise the cone.

In testimony whereof we have signed our names to this specification.

G. WARNER PARR.
ROBERT CROUCHER.